US009166906B2

(12) United States Patent
Laskowski

(10) Patent No.: US 9,166,906 B2
(45) Date of Patent: Oct. 20, 2015

(54) ROUTING METHOD IN ASYMMETRIC NETWORKS

(75) Inventor: Peter Laskowski, Madison, AL (US)

(73) Assignee: Intergraph Corporation, Madison, AL (US)

( * ) Notice: Subject to any disclaimer, the term of this patent is extended or adjusted under 35 U.S.C. 154(b) by 1012 days.

(21) Appl. No.: 12/334,891

(22) Filed: Dec. 15, 2008

(65) Prior Publication Data

US 2010/0150019 A1 Jun. 17, 2010

(51) Int. Cl.
*H04L 12/721* (2013.01)
*G06F 9/48* (2006.01)
*H04L 12/751* (2013.01)
*H04L 29/08* (2006.01)

(52) U.S. Cl.
CPC .............. *H04L 45/26* (2013.01); *G06F 9/4862* (2013.01); *H04L 45/02* (2013.01); *H04L 45/08* (2013.01); *H04L 67/34* (2013.01)

(58) Field of Classification Search
CPC ......... H04L 45/02; H04L 67/34; H04L 45/26; H04L 45/08; H04L 41/12; H04L 45/00; H04L 45/566; H04L 12/66; G06F 9/4862; H04W 40/246
USPC .................................. 370/338, 235; 709/245
See application file for complete search history.

(56) References Cited

U.S. PATENT DOCUMENTS

| 5,798,923 | A | 8/1998 | Laskowski | 364/420 |
| 6,570,867 | B1 | 5/2003 | Robinson et al. | 370/351 |
| 6,622,172 | B1 | 9/2003 | Tam | 709/232 |
| 6,940,832 | B2 | 9/2005 | Saadawi et al. | 370/328 |
| 7,813,326 | B1 * | 10/2010 | Kelm et al. | 370/338 |
| 7,957,355 | B1 * | 6/2011 | Heiferling et al. | 370/338 |
| 2002/0126623 | A1 | 9/2002 | Kiendl | 370/238 |
| 2004/0146007 | A1 | 7/2004 | Saadawi et al. | 370/238 |
| 2006/0235997 | A1 * | 10/2006 | Munirajan et al. | 709/245 |
| 2007/0008927 | A1 | 1/2007 | Herz et al. | 370/331 |

(Continued)

FOREIGN PATENT DOCUMENTS

| KR | 10-2007-0117571 | 12/2007 | ............. H04L 12/28 |
| WO | WO 2006/098723 A1 | 9/2006 | ............. H04L 12/56 |

OTHER PUBLICATIONS

Authorized Officer Kim Dae Sung, Notification of Transmittal of the International Search Report and the Written Opinion of the International Searching Authority, or the Declaration; PCT/US2009/067477; Jul. 27, 2010.

(Continued)

*Primary Examiner* — Dang Ton
*Assistant Examiner* — Mandish Randhawa
(74) *Attorney, Agent, or Firm* — Sunstein Kann Murphy & Timbers LLP

(57) ABSTRACT

A method for establishing or reinforcing a path through an asymmetric network of interconnected nodes includes storing navigation data at one or more nodes, for use by an agent in traveling from that node to a subsequent node, while ultimately traveling from a first terminal node (for example, a source node) to a second terminal node (for example, a destination node). As the agent travels from a first terminal node to a second terminal node via an intermediate node, the agent modifies the navigation data intended for use by an agent traveling from the second terminal node to the first terminal node via the intermediate node. Agents traveling complementary routes reinforce each other paths, allowing paths to be determined and reinforced.

38 Claims, 8 Drawing Sheets

(56) References Cited

U.S. PATENT DOCUMENTS

2008/0112325 A1     5/2008    Sivakumar et al. ............ 370/238
2009/0052321 A1*   2/2009    Kamath ........................ 370/235

OTHER PUBLICATIONS

Authorized Officer Kim Dae Sung, Written Opinion of the International Searching Authority; PCT/US2009/067477; Jul. 27, 2010.

Juvhaugen, Per, "Routing Protocols for Mobile Ad Hoc Networks Using Swarm Intelligence; A Survey," *Oslo University College*, Apr. 3, 2006, pp. 1-17.

Schoonderwoerd, R., et al., "Ant-Based Load Balancing in Telecommunications Networks," *Hewlett-Packard Laboratories*, pp. 1-26, 1996.

Korean Intellectual Property Office Korean Office Action—Application No. 10-2011-7016568, Dec. 12, 2007, 4 pages.

Eun Jae Lee and Miyoung Song, Letter from Darae Law & IP Firm dated Aug. 24, 2012 summarizing Korean Office Action in Korean Patent Application No. 10-2011-7016568, 3 pages.

Electrical, Canadian Official Action, Application No. 2,746,941, 3 pages, dated Jul. 31, 2013.

State Intellectual Property Office of the P.R.C., Chinese First Official Action, 7 pages, dated Jun. 13, 2013.

Yun Hua, "A Study on the Calculation of a Routing Method Which Supports a One-Way Path of a Mobile Network," *Master's Dissertation*, dated May 1, 2001.

Patent Examination Report No. 1; Patent Application No. 2009330451; 2 pages, Date of Issue: Jan. 30, 2103.

European Patent Office, Communication Pursuant to Rules 161(2) and 162 EPC; Application No. 09835526.6-1224; Jul. 27, 2011, 2 pages.

Supplementary European Search Report, European patent application EP 09 83 5526, Sep. 30, 2013.

Lu, Yong et al., "Adaptive Ant-Based Dynamic Routing Algorithm," Proceedings of the $5^{th}$ World Congress on Intelligent Control and Automation, Jun. 15-19, 2004, Hangzhou, P.R. China, pp. 2694-2697.

Schoonderwoerd, R. et al. "Ant-like Agents for Load Balancing in Telecommunications Networks," Proceedings of the First International Conference on Autonomous Agents, Marina Del Rey, CA, 1997, pp. 209-216.

Canadian Intellectual Property Office, Office Action pertaining to Application No. 2,746,941, PCT No. US 2009/067477, 2 pages, dated Jul. 24, 2014.

Tsar & Tsai Law Firm, Letter to Thomas J. Tuytschaevers re: Taiwan Patent Application No. 98140726, dated Sep. 23, 2014, 7 pages.

Taiwanese Intellectual Property Office, Taiwanese Office Action and Search Report, Application No. 98140726, dated Nov. 30, 2009, 9 Pages.

Taiwanese Intellectual Property Office (English Translation), Taiwanese Office Action and Search Report, Application No. 98140726, dated Nov. 30, 2009, 1 page.

\* cited by examiner

Downstream Routing Table at Node 105
for Ants Traveling to Node 109

| Downstream Node | Weight (Pheromone) |
|---|---|
| 104 | 1 |
| 106 | 2 |
| 107 | 10 |

Figure 2C

ROUTING METHOD IN ASYMMETRIC NETWORKS

TECHNICAL FIELD

The present invention relates to networking, and more particularly to using swarm intelligence for determining route through an asymmetric network.

BACKGROUND ART

It is known in the prior art to use swarm intelligence to establish a route through a network. For asymmetric networks, including networks that may be dynamic, swarm intelligence has been employed, as in U.S. Pat. No. 6,940,832 ("Routing Method for Mobile Infrastructureless Network," issued to Saadawi et al. on Sep. 6, 2005). An overview of the application of swarm intelligence is presented in "Routing Protocols for Mobile Ad Hoc Networks using Swarm Intelligence, A Survey," by Per Juvhaugen of Oslo University College, Apr. 3, 2006. For symmetric, non-dynamic networks, Dijkstra's algorithm is generally recognized as optimal for identifying the preferred route through a network.

SUMMARY OF THE INVENTION

A first embodiment of the invention provides a network of interconnected nodes, including a source node and a destination node. It is not necessary that each node be connected to each other node, or that each node be reachable from each other node without having to pass through an intervening node.

To send a data packet or other object from the source node to the destination node, a path must be established. To that end, a plurality of a downstream data agents are sent from the source node to the destination node via one or more intermediate nodes, and a plurality of a upstream data agents are sent from the destination node to the source node via one or more intermediate nodes. Each data agent navigates independently by determining, from each node, which node should be its next stop, until it completes its journey.

In a preferred embodiment, each node stores a downstream routing table that stores information about each downstream node for use by agents traveling to the destination node, and an upstream routing table that stores information about each upstream node for use by agents traveling upstream to the source node. A data agent arriving at a node and navigating downstream will select its next destination from the set of downstream neighbors, and will base its decision, in part, on information available to the data agent in the downstream routing table. Similarly, a data agent arriving at a node and navigating upstream will select its next destination from the set of upstream neighbors, and that selection will be made, in part, based on information available to the data agent at the node, including the data in the upstream routing table.

To reinforce its path, a data agent traveling downstream will modify the upstream routing table at each node it visits, so that an upstream data agent arriving at that node will be more likely to select as its next destination the upstream node from which the downstream data agent arrived. Similarly, a data agent traveling upstream will modify the downstream routing table at each node it visits, so that a downstream data agent arriving at that node will be more likely to select as its next destination the downstream node from which the upstream data agent arrived. The quantity of the modification performed by a data agent at a node is a function of the quality of the path traveled by that agent prior to arriving at the node.

In this manner, agents navigating independently in opposite directions reinforce the pathways between the source node and the destination node. Ultimately, the preferred path from the source node to the destination node can be determined as the path defined by the nodes with the most reinforcement.

BRIEF DESCRIPTION OF THE DRAWINGS

The foregoing features of the invention will be more readily understood by reference to the following detailed description, taken with reference to the accompanying drawings, in which:

FIG. 2C includes an illustrative routing table.

DETAILED DESCRIPTION OF SPECIFIC EMBODIMENTS

Figure 1:
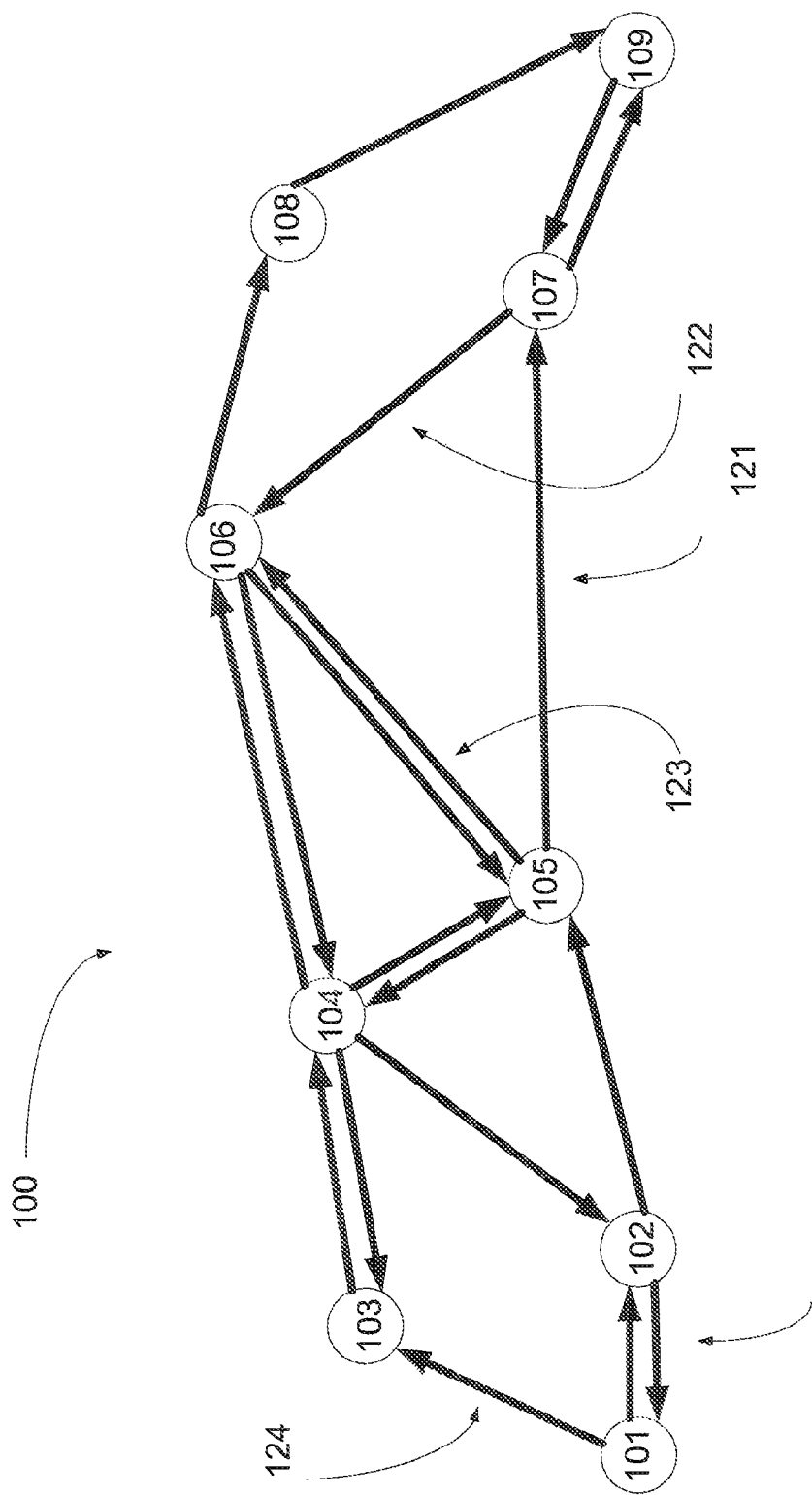
FIG. 1 schematically illustrates an asymmetric network.

In illustrative embodiments, each node of a network stores information about neighboring nodes, and a first species of agent traveling the network from a source node to a destination node uses a subset of that stored information to navigate to the destination. A second species of agent travels the network in the opposite direction—from the destination node to the source node—and also uses a subset of that stored information to navigate to the source destination. Each agent updates a subset of the information at each node it visits to reinforce the quality of the path that the agent traveled prior to arriving at the node. Specifically, an agent of one species updates the information used by the agents of the other species. In this way, agents of each species operate on data that is continuously updated by agents of the other species. In some embodiments, dedicated ants may retrace the path taken by a previous ant to add additional reinforcement to a desired path.

A path can be defined in some embodiments as end-to-end (e.g., source node to destination node) or from end-to-intermediate (e.g., source to an intermediate node, or intermediate node to destination), or intermediate-to-intermediate (e.g., any two nodes on a path between the source and destination).

A network has a plurality of nodes. A node may be, for example, a city, a factory, or a computer (e.g., a server).

Links interconnect the nodes of a network. Examples of a network include cities interconnected with roads, factories interconnected with railroad lines, or computers in a communications system interconnected with communications lines. In general, it is not necessary that each node in a network be connected directly to each other node (i.e., the definition of network does not require that each node be reachable from every other node without having to pass through an intervening node).

In some embodiments, each link is unidirectional, meaning that an object may move along the link in only one direction, from one node to another. Traveling from one node to another by traversing a link between the nodes may be referred to as a "hop." For example, in FIG. 1, a truck at node 102 could move directly to node 101 by traveling the link 120 between them (one hop). If two nodes are not connected by a link, an object may still be able to travel from one to the other by first traveling to one or more intermediate nodes. For example, also in FIG. 1, a truck at node 102 could travel to node 103 by first traveling to node 101 using link 120, and then traveling to node 103 by traversing link 124 (two hops). Alternately, the truck could travel from node 102 to node 103 by first traveling via node 105 and 104 to node 103 (three hops).

If bidirectional travel is desired between two nodes, a pair of complementary unidirectional links may connect the nodes to effectively create a bidirectional link.

Each link has an associated cost imposed on an object traversing it. For example, if the link 121 in FIG. 1 is a road between a city at the node 105 and a city at the node 107, the cost of a truck traveling that road 121 may be measured by any number of factors, such as the time it takes to traverse its distance, or the cost of tolls on to be paid, the amount of traffic on the road, or the amount of fuel required for the trip. As another example, if the link 121 is a communications channel between a computer at node 105 and another computer at node 107, the cost of sending a data packet over the link 121 may be measured by factors such as bandwidth, signal-to-nose ratio, or security (or lack of security) in the channel, for example.

Similarly, the cost of the path from one node to another node is the sum of the costs of each link in the path. Among other things, the quality of a path may be judged based on its cost, for example. Assessment of costs allows one link or path the be compared to another.

Each node in the network has neighboring nodes. For a given node, its neighbors include the set of all nodes that are connected to the given node via a single link. The set of neighbor nodes for a given node can further be subdivided into two classes: downstream nodes and upstream nodes. A "downstream" node is a node that can be reached from the given node via a link, without passing through another node. This requires a link or path that will carry traffic in the appropriate direction (i.e., from the given node to the neighbor node). In contrast, an "upstream" node is a node that has a link directly to the given node, such that traffic can travel from the upstream node to the given node without passing through another node. For example, in the network 100 in FIG. 1, the neighbors of the node 105 are the nodes 102, 104, 106 and 107. Of these, the downstream nodes are the nodes 104, 106 and 107, and the upstream nodes are the nodes 102, 104, and 106. Note that nodes are classified as "upstream" or "downstream" based on their link relationships with other nodes, and not based on whether they lie on a path between any two nodes (e.g., a given node may be classified as "downstream" with respect to its neighboring nodes even if the given node does not lie a path of an agent traveling downstream between a source node and a destination node).

A symmetric network is a network for which each link from a first node to a second node has a counterpart link from the second node to the first node.

A network is asymmetric if the cost of traveling from a first node to a second node is not the same as the cost of traveling from the second node to the first node, or if a link on one direction does not exist at all. An asymmetric network 100 is illustrated in FIG. 1. The network 100 is asymmetric at least because the link between some pairs of nodes only allow travel in one direction. For example, between the node 105 and the node 107 there is only one link (121) that travels from the node 105 to the node 107. There is no link from the node 107 to the node 105. The network 100 will be used for a variety of illustrative embodiments herein, but the present invention and its application are not limited to the network 100. In some embodiments, an asymmetric network may contain symmetric link(s) or even symmetric sub-network(s), and still is considered an asymmetric network.

A network is a static network if the links and costs do not change. In contrast, a dynamic network is one in which links or paths may change over time. For example, the cost of a given path may go up, thereby making a path that contains that link less desirable, such as if a road is undergoing construction that slows traffic and increases fuel use. Alternately, a given path may become unavailable altogether, such as if a road is blocked or a bridge is out. In same cases, a node in a dynamic network may change position in the network, requiring old links to be broken and new links to be established.

When an object travels from one node to another, a path must be determined. If a link connects two nodes, then the object may travel from one node to the other by traversing that link. However, if the two nodes are not connected by a link, or if an existing link between them is undesirable (e.g., too costly), then the object may reach its destination by passing through one or more intermediate links. For example, a message packet at node 105 may travel to node 106 either directly via path 123, or indirectly via a combination of path 121 and path 122, reaching node 106 via intermediate node 107.

In determining an optimal path, the cost of each available path may be considered. For a delivery truck example, if time is an important factor, the quickest route may be chosen, even if it costs more fuel. Alternately, if conserving fuel is important, the shortest route may be chosen, even if it is not the quickest. Generally, when developing a path, a link with a lower cost is more desirable than a link with a higher cost.

One approach to identifying the optimal path may be to have a network analyst assess all possible paths, and determine the preferred path based on factors that are important to the analyst. However, this approach is cumbersome, slow, and prohibitively expensive with larger networks.

Methods for finding an efficient path through a symmetric, static network are well known, and Dijkstra's algorithm is generally recognized as an optimal approach.

In asymmetric networks, however, other approaches have been developed. Some approaches are based on swarm intelligence (which may be known as "ant theory"), as described, for example, in the publication entitled in "Routing Protocols for Mobile Ad Hoc Networks using Swarm Intelligence, A Survey," by Per Juvhaugen of Oslo University College, Apr. 3, 2006.

Figure 2A:
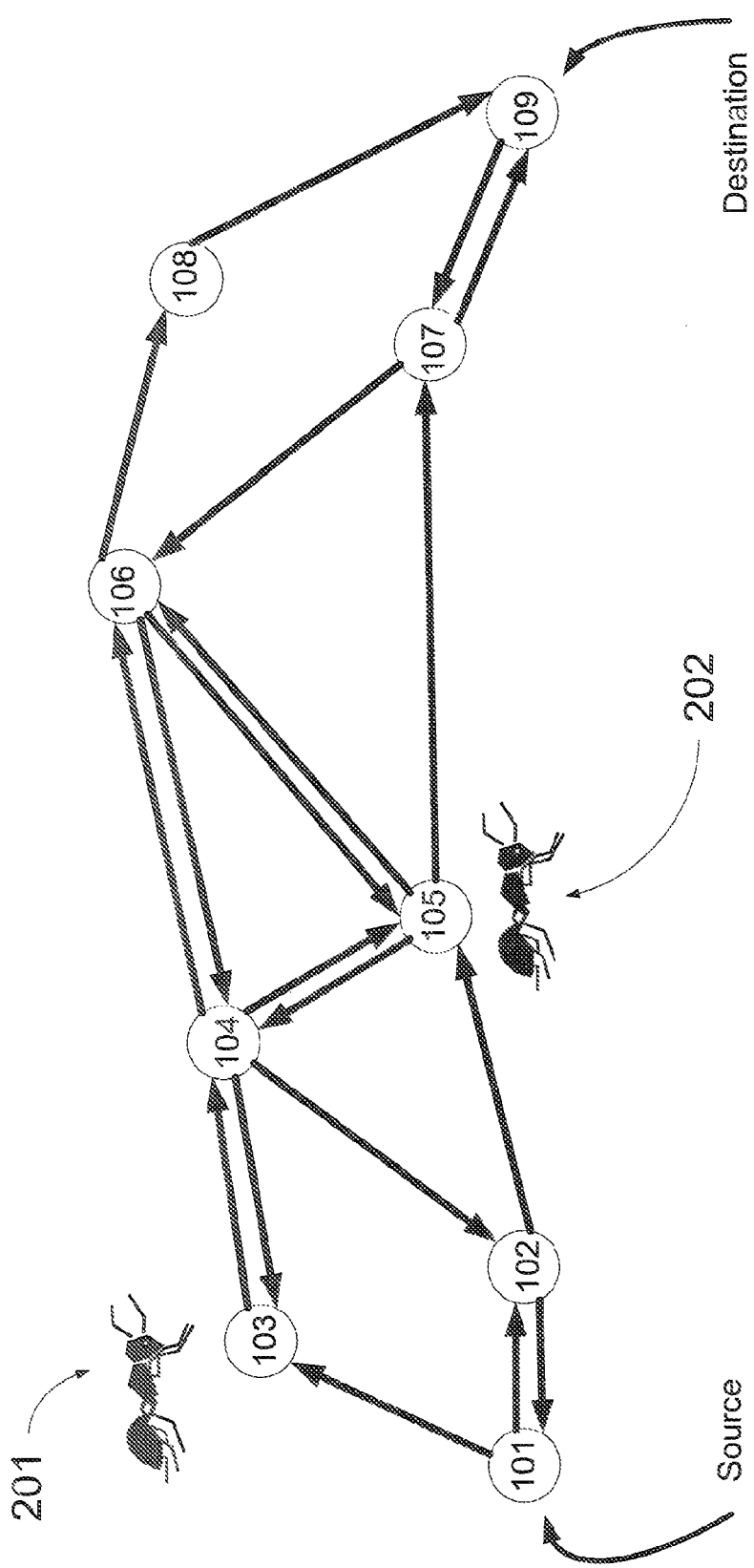
FIG. 2A and FIG. 2B schematically illustrate a prior art method of determining a route through an asymmetric network.
Figure 2B:
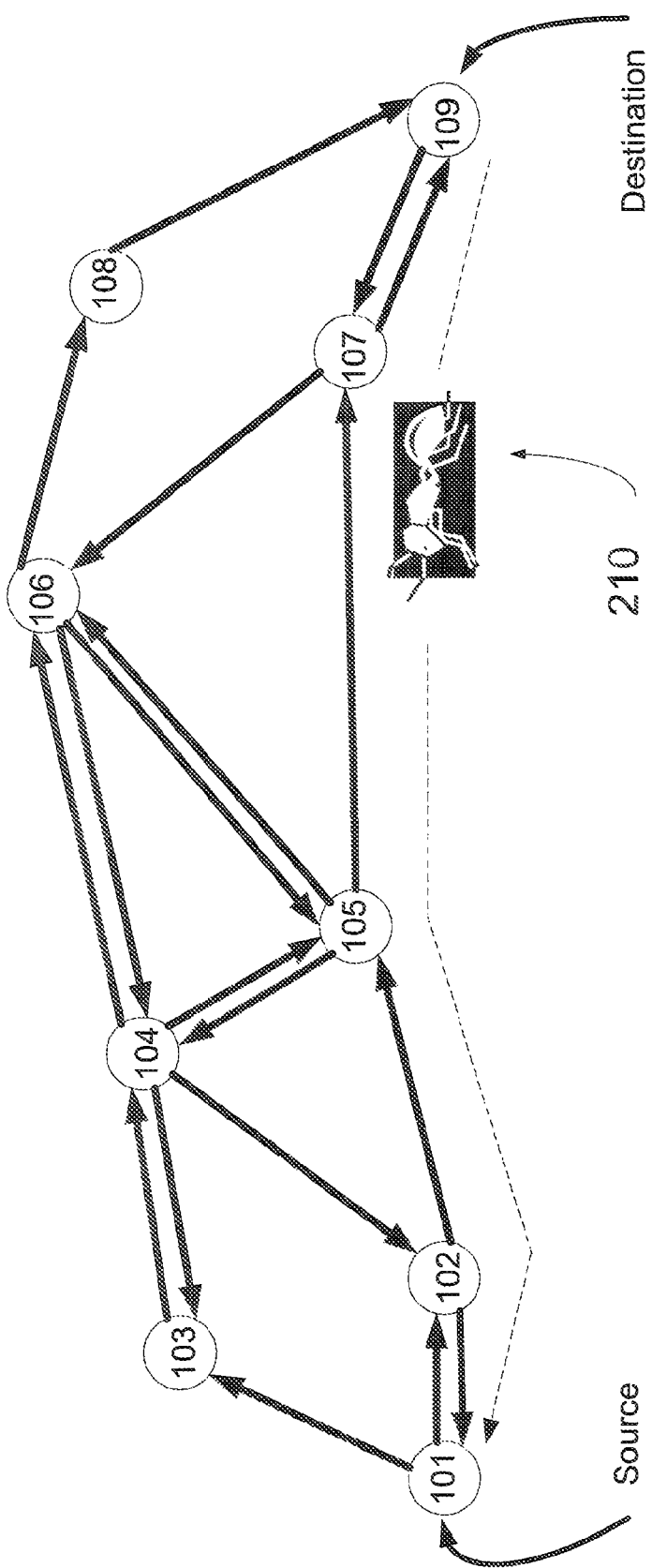

A prior art method for using swarm intelligence to find a path through the network 100 from a source node 101 to a destination node 109 is schematically illustrated in FIG. 2A and FIG. 2B. This method is similar to the way ants find, establish, and reinforce paths for other ants to travel via the use of pheromones, and analogies to ants and pheromones are helpful in understanding the prior art method. In this method, an agent (which may be known as an "ant") is released from the source node to travel to the destination node (and therefore may be known more specifically as a "forward ant").

In the prior art, an ant traveling downstream navigates the network by hopping from one node to the next, until it reaches its destination. The ant navigates independently by determining, at each node, what downstream node it should travel to next. In other words, the ant does not follow a pre-defined path. Specifically, upon arriving at a node, the ant assess data available to it at that node using a navigation equation, which is an algorithm that uses available information to determine the next node in the ant's journey.

There may be several types of information available to an ant at each node. Some information, which may be known as the "local visibility heuristic," may only involve information pertaining to the links to downstream neighbors, such as availability, bandwidth, or time delay. Depending on the navigation equation, the ant's decision may be a function on only one such factor, or a function of several factors weighed together.

The navigation equation also includes a random probability factor. As a consequence, the lowest-cost link may not always selected, although it is more likely to be selected (and statistically is therefore more often selected) than other links. For example, the ant may take the lowest-cost link 90 percent of the time, and one or more other links the rest of the time.

Each node may also contain other information for use by the ant. Specifically, each node may have a routing table for each possible destination node. Each routing table contains weighting factors that influence the probability that any given downstream node is selected by an ant. The weighting factor is similar to pheromones left by some ants at points on a trail, so that later forward ants can follow the trail by evaluating the strength of the pheromone deposit at various points. The weighting factor may convey information about the links available from the node (e.g., the cost of traversing each link). Alternately, or in addition, the weighting factor may convey information about the adjoining nodes. For example, there may be a low cost link from one node to a second node, but if the second node has undesirable characteristics (such as a low battery in a computer at that node) then that information may be reflected by reducing the desirability of the link to that node by raising the cost of that node. In this way, the weighting data in a routing table may contain information not only about the quality of a link, but also about the quality of the node at the other end of that link. In illustrative embodiments (discussed below), all such information will be discussed simply as part of the information about the link itself, although various embodiments are not so limited.

When an ant arrives at its destination from a source node, the cost of the path taken by that ant is assessed, and compared to the cost of paths taken by other ants arriving at the destination node from the same source node. If the path taken by that ant compares favorably with other paths (for example, if the path has less cost than the other paths), then that path may be reinforced by sending a backward ant from the destination node to the source node. The backward ant slavishly follows the path of the first ant but in reverse. Along the way, the backward ant updates the routing table (e.g., the pheromone data) at each node to reinforce the path taken by the first ant.

In summary, in the prior art, an agent navigates downstream from a source node to a destination node by hopping from node to node. At each node, the agent determines what downstream node is the next node on its journey using a navigation equation. The navigation equation selects a downstream node based on an assessment of information available at its present node, including information about the available downstream nodes and links, an element of random chance, and weighting factors to influence the element of random chance. When a preferred path is identified, that path is reinforced by sending another agent backwards along the path, reinforcing the path as it goes.

As an example of the prior art, in FIG. 2A, two downstream ants 201 and 202 have been released from the source at the node 101. The ant 201 has reached the node 103, and the ant 202 has reached the node 105. Both ants 201 and 202 are navigating independently to find the destination node 109.

In FIG. 2A, the ant 202 at the node 105 must decide which node will be its next destination. Downstream nodes 104, 106 and 107 are available options. The node 102 is not a downstream node in this example, and is therefore not an option for the ant 202, because there is no link that will allow a hop directly from the node 105 to the node 102. In making this decision, the ant 202 may consider the local visibility heuristic. If a prior generation of ant has traversed the network so that a backward ant has left a pheromone trail in local routing tables, the ant 202 may also have access to that pheromone data stored in the routing table associated with the ant's destination.

For example, if the ant 202 is at the node 105 and its ultimate destination is the node 108, then the ant 202 accesses the routing table associated with the node 108. If finding a route with the fewest links is important, that routing table will, for example, contain pheromones to make the node 106 the most attractive option for the ant (since the node 106 is only one hop away from the ultimate destination node 108).

Alternately, if the ant's ultimate destination is the node 109, then the ant accesses the routing table associated with the node 109. That routing table will, for example, contain pheromones to make the node 107 the most attractive option for the ant (since the node 107 is only one hop away from the ultimate destination node 109). An example of such a routing table is shown in FIG. 2C. Thus, an ant at the node 105 may make a different decision from among the available downstream nodes, depending on its ultimate destination.

When the choice of the next node is made, the ant 202 will traverse the link to the selected node. If the node 109 is the ultimate destination, then by repeating this process, the ant 202 will eventually find its way to the destination node 109.

When ants have arrived at the destination node 109, the destination node will assess which ant took the best (e.g., least cost) path from the source node 101 to the destination node 109. The preferred path may be determined by any desired set of criteria depending on the costs to be optimized (for example, quickest transit, or least fuel used in transit). The ant that took the best path may be known as the "champion" ant.

Once the best path has been determined, another ant (which may be known as a "backward" ant) is released from the destination node 109, to travel upstream to the source node 101. In contrast to the forward ant, the backward ant does not navigate independently. Rather, the backward ant retraces the route taken by the champion forward ant. At each node, the backward ant modifies the pheromone data in the routing table associated with the destination node to be used by later generations of forward ants traveling to the destination node. Specifically, the pheromone data at each node on that path is reinforced to favor the downstream node from which the backward ant just arrived. In this way, any ant arriving at a node on its way to the destination node (irrespective of that ant's ultimate source) will be influenced to follow the path that has been identified as preferred.

For example, if the ant 202 in FIG. 2A is determined to be the champion ant after traversing the path 101-102-105-107-109, then a backward ant 210 is sent from destination node 109 to source node 101 via the following path: 109-107-105-102-101, as illustrated in FIG. 2B. At node 107, the backward ant 210 modifies the routing table associated with node 109 to increase the chances that a forward ant arriving at the node 107 will next choose the node 109, instead of the node 106. The backward ant 210 modifies the routing table at each of the other nodes in the path to favor the next downstream node in the path.

By traversing the path of the recognized champion ant (node by node, in reverse order) and increasing the weighting factors at each node, the backward ant reinforces the path. Consequently, the path of the champion ant is strengthened and is therefore more likely to be followed by subsequent ants. In contrast, the other nodes (i.e., the nodes not on that path) become relatively less attractive to subsequent ants, and paths through those nodes are therefore relatively weaker. By this process, which may include one or more iterations, a best path may emerge and may be identified as the path consisting of the nodes with the most pheromone. For this reason, this approach to identifying a path may be known as an "emergent phenomenon."

Several observations may be helpful at this point. First, the backward ant will travel on a link in the wrong direction. This is permissible in the service of modifying the routing tables in a (now pre-defined) downstream path. Second, the forward ants do not modify the routing tables. Rather, the forward ants only follow the "pheromone" trail, while the pheromone trails are created and reinforced by the backward ants that dutifully and slavishly traverse the (now pre-defined) downstream path. Thirdly, the backward ants do not navigate independently (since they slavishly traverse the aforementioned downstream path), and therefore, there are no routing tables for ants traveling upstream (e.g., from destination node 109 to source node 101). Finally, it may not be possible to send backward ants along a real network (for example, it would not be possible to send a truck the wrong way on a one-way street, or a data transmission the wrong way on a unidirectional data link). Therefore, such processes may be best implemented on a model of the target network, for example, via modeling software running on computer hardware.

In contrast to the prior art, some embodiments of the present invention may use ants traveling upstream (which may be known as "upstream ants") from the destination node to the source node, and navigating independently, and may allow ants traveling downstream to modify upstream routing tables as they autonomously navigate the network.

Figure 3A:
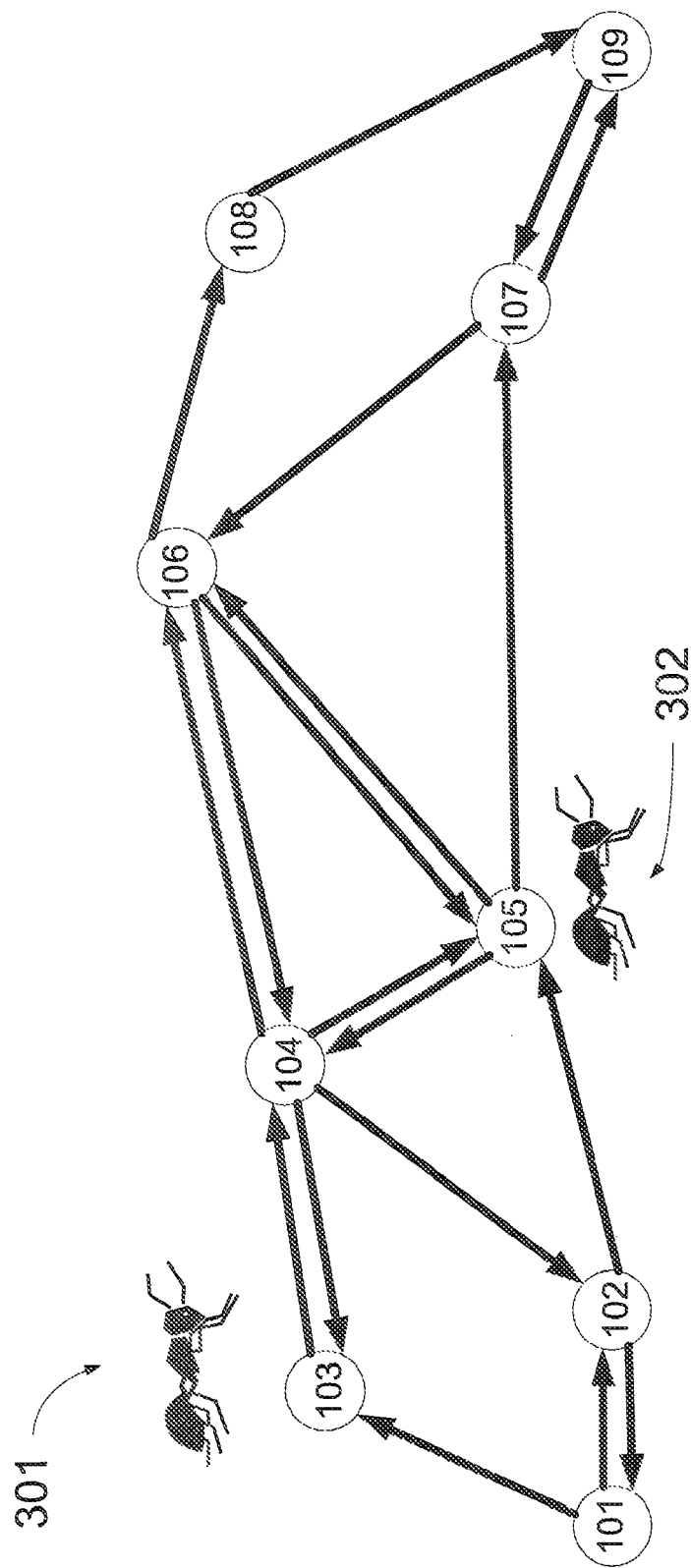
FIG. 3A and FIG. 3B schematically illustrate one embodiment of the present invention.
Figure 3B:
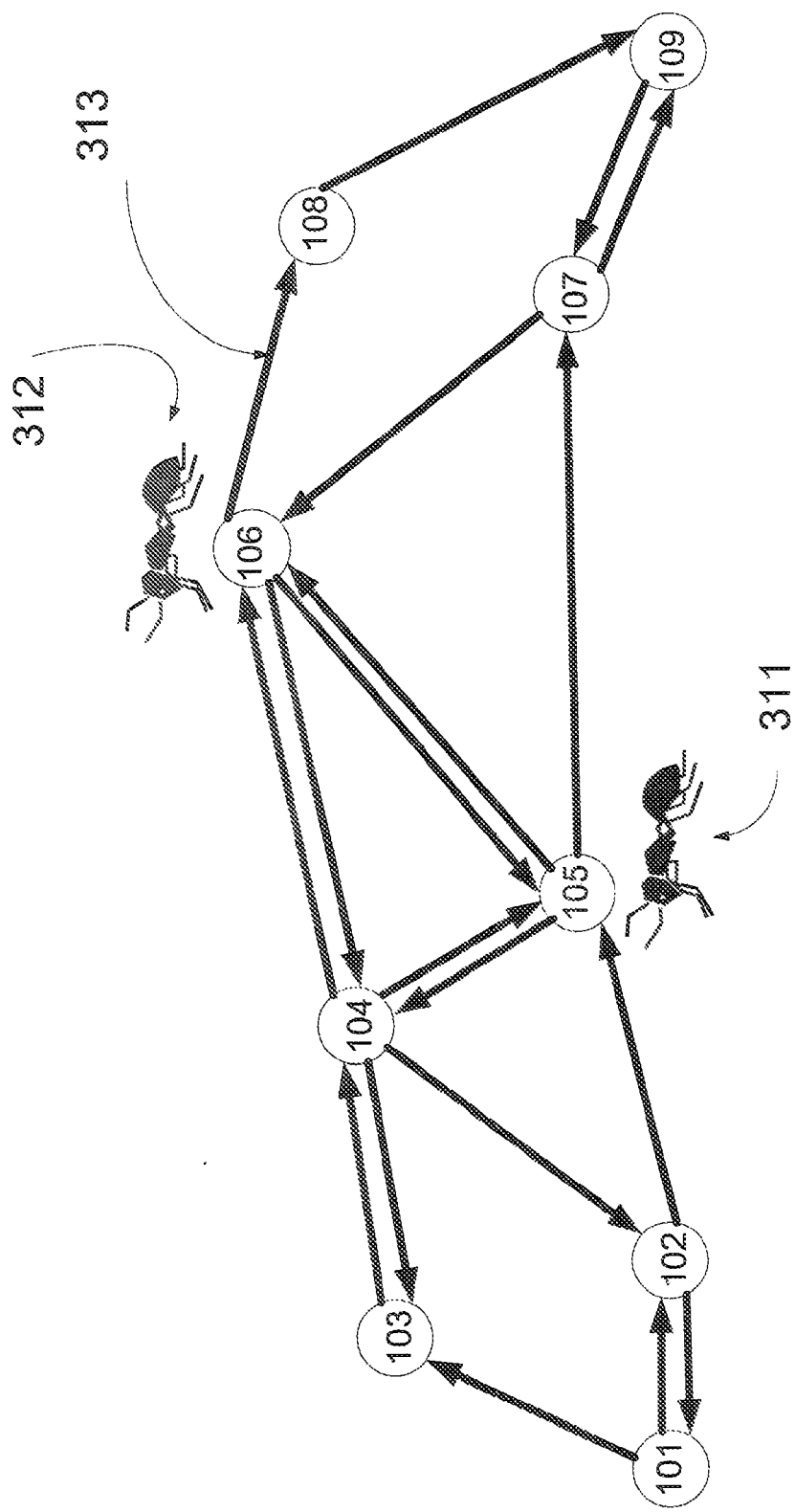

One embodiment of the present invention is illustrated in FIG. 3A and FIG. 3B. In FIG. 3A, one or more downstream ants (in this example, only two downstream ants, 301 and 302) are released from the source node 101, to independently navigate to the destination node 109. The navigation is similar to the example of FIG. 2A and FIG. 2B, in that the downstream ants 301 and 302 navigate independently. In a preferred embodiment, each node in the network 100 has a downstream routing table for each possible destination node.

FIG. 3B illustrates a set of upstream ants 311 and 312, which have departed from the destination node 109, and are independently navigating to the source node 101. Note that these upstream ants 311 and 312 are distinct from the backward ants of the prior art at least in that upstream ants 311 and 312 navigate independently to the source node 101, rather than slavishly traverse the pre-defined downstream path in reverse.

A consequence of the use of the upstream ants 311 and 312 is that each node in the network 100 will preferably have an upstream routing table for each possible source node.

In one embodiment of the present invention, both upstream ants and downstream ants travel through the network between a source node and a destination node. In a preferred embodiment, each node contains a downstream routing table for each other node in the network (for use by an ant traveling downstream to each such other node) and an upstream routing table for each other node in the network (for use by an ant traveling upstream to each such other node).

Unlike the prior art, in some embodiments of the present invention, both downstream ants and upstream ants modify routing tables at each node that they pass through. Specifically, downstream ants modify the data in the upstream routing table, and upstream ants modify the data in the downstream routing table.

The amount by which an ant modifies a routing table (or, in the biological analogy, the amount of pheromone left by an ant) depends on the quality of the path that the ant has traveled prior to arriving at the node. Each node may assess the cost of the arriving ant's path and compare that cost to other ants that have arrived at that node while traveling from the same source node to that node (note that the evaluation may be done irrespective of the destination nodes of the various ants). The pool of ants used for this comparison may be specified by the system operator. Alternately, the pool of ants used for this comparison may simply be the group of all ants that have arrived at that node during a defined period of time, or may be defined as an integer number of preceding ants. The ants that have traveled the best path modify the routing tables most heavily and therefore have the most influence over subsequent ants arriving at that node.

For example, the cost of the path followed by a downstream ant arriving at the node after traveling from a source node is assessed. That cost is then compared to the costs of the paths taken by other such ants that have arrived from the same source node. If the path followed by that ant is a preferred path (e.g., lowest cost), then that ant updates the upstream routing table more heavily than other downstream ants that arrived via less desirable (e.g., higher cost) paths. In this way, ants traveling to the source node are more likely than they otherwise would have been to follow the course charted by the downstream ant. In a similar way, an upstream ant originating at a destination node strengthens the path of future downstream ants traveling to that destination node.

Several advantages of the process described above are readily apparent. First, the initial generation of ants does not need to navigate to their destination node completely randomly, as in the prior art. In the prior art, the first generation of forward ants searches randomly for the destination node, with only the local visibility heuristic data available to inform the navigation equation. In contrast, some embodiments of the present invention allow upstream ants to begin populating downstream routing tables in the first generation. Consequently the first generation of downstream ants find, as they travel into the network, data in the downstream routing tables even before the first ant has reached the destination. This may facilitate a faster convergence of path finding.

The ants also can update routing tables other than those associated with the source and/or destination nodes. For example, an ant arriving at a given node may update the routing tables for every other node that the ant has visited on its journey. In this way, another ant arriving at that node may find helpful data in the routing table for its destination node (for example) even if no ants have been released from or sent to that node.

In addition, if the network changes in a way that eliminates an existing path, or that makes an existing path less desirable, some embodiments allow the routing method to adapt quickly and efficiently to the new network configuration. For example, if a node changes location, it would be difficult for an ant to find that node in its new location by taking a completely random trip through the network. However, in some embodiments, upstream ants from the moved node will quickly begin to disseminate information about paths that lead to the node's new location. It is much easier for an ant that started at a source node to stumble upon a node containing information about the new location of a destination node (e.g., pheromone left by an upstream ant that departed from the destination node) than it is to stumble upon the destination node itself.

FIG. 3A schematically shows an illustrative embodiment in which the downstream ant 302 arrives at the node 105 from the node 102. The node 105 contains both a downstream routing table, and an upstream routing table. The downstream ant 302 modifies the upstream routing table at the node 105 to increase the chance that a later upstream ant arriving at the node 105 (on its way to the source node 101) will select the node 102 as the next node in the upstream ant's journey to the source node 101. The ant 301 navigates in a similar way, and also updates routing tables as it goes.

It is possible that both ant 301 and ant 302 will eventually pass through the node 107 (for example, if the ant 302 hops directly from the node 105 to the node 107, and if the ant 301 hops from the node 103 to the node 104, and then to the node 105, and then to the node 107). The node 107 will evaluate the path taken by the ant 301, and the path taken by the ant 302. If minimizing the number of hops in a path is an important criteria, the node 107 may determine that the path taken by the ant 302 is the preferred path, since the ant 302 has taken only three hops to reach the node 107 from the node 101, while the ant 301 has taken four hops to reach the node 107 from the node 101. When the ant 301 arrives at the node 107, the ant 301 will not modify the routing table as much as the ant 302, since the path taken by the ant 301 is a costly, and therefore less desirable, path. In this way, the path 101-102-105-107 is reinforced, while the path 101-103-104-105-107 is left relatively weaker.

Similarly, in FIG. 3B, an upstream ant 312 arrives at the node 106 from node 108. Note that the upstream ant 312 has traveled the link 313 between the node 106 and the node 108 in a backwards direction (i.e., against the defined flow of the link 313; in other words, the wrong way up a one-way street). Upstream ants must travel the wrong way on each link because, ultimately, the upstream ants are helping to define a downstream path, and if an upstream ant were to travel the "right direction" on a link, the corresponding downstream path could not use that link (i.e., that path would be the wrong direction for a downstream ant trying to use the link).

The upstream ant 312 modifies the downstream routing table at the node 106, to increase the chance that a later downstream ant arriving at the node 106 will select the node 108 as the next node in the downstream ant's journey to the destination node 109.

Similarly, the upstream ant 311 arrives at the node 105 from the node 107 and modifies the downstream routing table at the node 105 to increase the chance that a later downstream ant arriving at the node 105 will select the node 107 as the next node in the downstream ant's journey to the destination node 109.

More than one ant, or more than one swarm of ants, of each species may be employed. For example, a first generation of ants may be released into the network, and when the first generation of ants has completed its work, one or more subsequent generations of ants may be released into the network. Each generation of ants benefits from the work done by the ants that preceded it. Through a repetitive application of downstream ants and upstream ants, a pattern emerges. The pattern consists of nodes with elevated "pheromone" levels in their respective routing tables.

A set of one or more paths from the source node to the destination node is derived from the pattern. One way to derive a path is by starting at the source node and building the path one node at a time by always choosing (as the next node) the downstream neighbor with the greatest pheromone in the downstream routing table. This continues until a path of nodes is defined from the source node to the destination node.

Another (possibly different) path may be derived by starting at the destination node and building a path one node at a time by always choosing the next node as the upstream neighbor with the greatest pheromone in the upstream routing table. This continues until a path of nodes is defined from the source node to the destination node.

This path, or set of paths, represents the optimal route for traveling from the source node to the destination node on the existing network. The optimal path or paths can be used for routing information or objects (such as data packets or delivery trucks, for example) from the source to the destination.

Figure 4A:
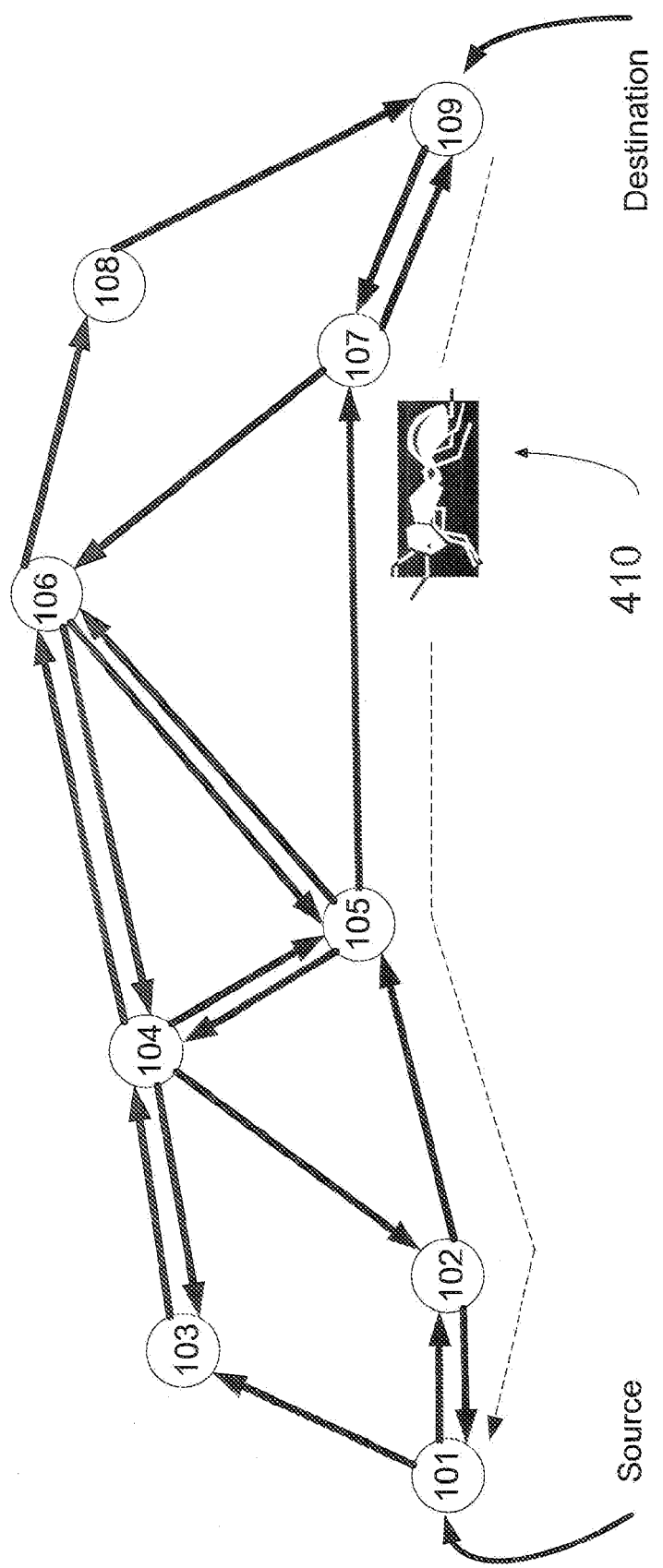
FIG. 4A illustrates an embodiment of the present invention.

In another illustrative embodiment, a path may be reinforced by sending a backward ant to retrace the path. In one embodiment, as illustrated in FIG. 4A, when a downstream ant (not shown) arrives at the destination node 109 from the source node 101, its path may be compared to the paths taken by other downstream ants arriving at the node 109 from the source node 101. If the path is deemed worthy of reinforcement (for example, because it is the lowest cost path found at that time), a backward downstream ant 410 is released from the destination node 109, to travel upstream to the source node 101 along the exact same path taken by the successful downstream ant. At each node along the way, the backward downstream ant 410 reinforces the upstream routing table associated with the source node 101. In other words, the backward downstream ant 410 reinforces the same routing table as the successful downstream ant on which the backward downstream ant 410 is based. This is different from the prior art backward ant at least because the prior art backward ant traveled upstream and modified the downstream routing table at each node, whereas the backward downstream ant 410 modifies the upstream routing table at each node.

Figure 4B:
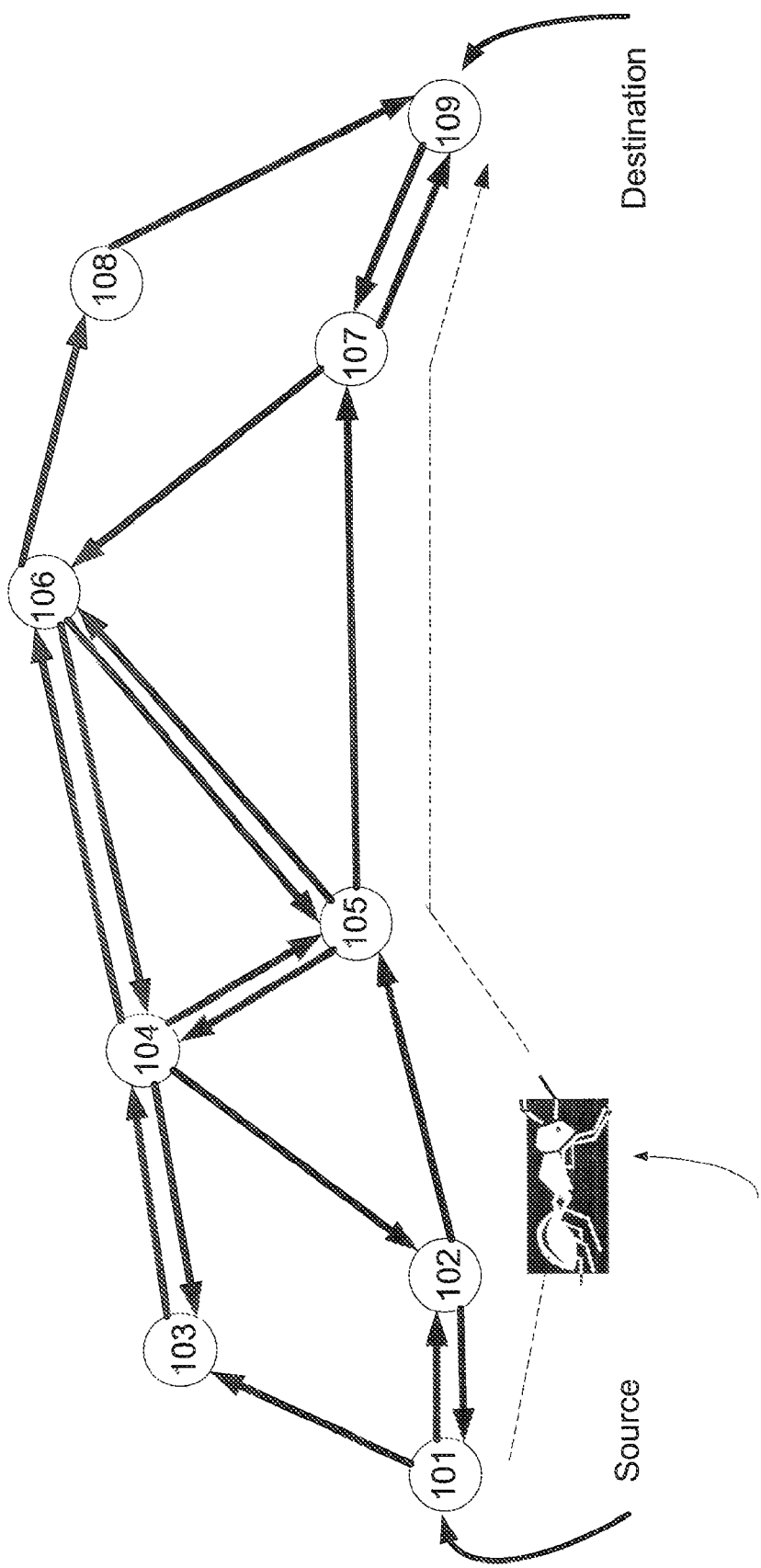
FIG. 4B illustrates an embodiment of the present invention.

In another embodiment, as illustrated in FIG. 4B, when an upstream ant (not shown) arrives at the source node 101 from the destination node 109, its path may be compared to the paths taken by other upstream ants arriving from the destination node 109. If the path is deemed worthy of reinforcement, a backward upstream ant 411 is released from the source node 101 to travel downstream to the destination node 109 along the exact same path taken by the successful upstream ant. At each node along the way, the backward upstream ant 411 reinforces the downstream routing table associated with the destination node 109. In other words, the backward upstream ant 411 reinforces the same routing table as the successful upstream ant on which the backwards upstream ant 411 is based.

It can be seen that various embodiments of this present invention facilitate both inter-species communication among ants (e.g., downstream ants communicating with upstream ants via the upstream routing tables, and upstream ants communicating with downstream ants via the downstream routing tables), but also intergenerational communication (e.g., each generation of ants may communicate with subsequent generations via the routing tables). The effects of such communication are quick and efficient methods of finding and maintaining preferred paths through a network. The path or paths identified using these methods may then be used to send data or other objects across the network.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of establishing a path from a source terminal node, which may be referred-to as a first node, to a destination terminal node, which may be referred-to as a second node, through an asymmetric network comprising a plurality of interconnected nodes, wherein an agent traveling through the network traverses links connecting one node to the next until it reaches the destination terminal node, the method including:
   receiving a first agent at a third node from a fourth node, wherein the first agent originated at the source terminal node and is navigating through the network toward the destination terminal node;
   prior to directing the first agent to the next node, modifying a first upstream navigation data table at the third node based on information about the path previously traveled by the first agent, wherein the data in the first upstream navigation data table is configured to direct a later agent from the third node to the source terminal node;
   determining a next node on the path from the third node based on data in a first downstream navigation data table, wherein the data in the first downstream navigation data table is configured to direct the first agent to the destination terminal node; and
   directing the first agent to the next node.

2. The method of claim 1, wherein the data in the first upstream navigation data table comprises information about one or more upstream nodes.

3. The method of claim 2, wherein the data in the first upstream navigation data table further comprises a first weighting factor.

4. The method of claim 1, wherein the information about the path previously traveled by the first agent comprises information about the fourth node.

5. The method of claim 4, wherein the information about the fourth node comprises information pertaining to the operating characteristics of the fourth node.

6. The method of claim 4, wherein the information about the fourth node comprises information about a link connecting the fourth node to the third node.

7. The method of claim 1 wherein modifying the first upstream navigation data table comprises changing at least one weighting factor to reinforce the path previously traveled by the first agent.

8. The method of claim 1, wherein the first downstream navigation data table comprises information about one or more downstream nodes.

9. The method of claim 8, wherein the first downstream navigation data table comprises a second weighting factor.

10. The method of claim 9, wherein the act of determining comprises assessing information about one or more downstream nodes by combining such information with data from the first downstream navigation data table.

11. The method of claim 1, further including:
    sending a second agent from the destination terminal node to the source terminal node, the second agent traversing a path previously followed by the first agent, the second agent modifying navigation data in a second downstream navigation data table of at least one intermediate node to reinforce the path previously followed by the first agent, the navigation data in the second downstream navigation data table configured to direct a subsequent agent to the destination terminal node.

12. The method of claim 11 wherein modifying the navigation data comprises changing at least one weighting factor.

13. A method of establishing a path from a source terminal node, which may be referred-to as a first node, to a destination terminal node, which may be referred-to as a second node, through an asymmetric network comprising a plurality of interconnected nodes, wherein an agent traveling through the network traverses links connecting one node to the next until it reaches the source terminal node, including:
    receiving a first agent at a third node from a fourth node, wherein the first agent originated at the destination terminal node and is navigating through the network to the source terminal node;
    modifying a first navigation data table at the third node based on information about the path previously traveled by the first agent, wherein the data in the first navigation data table is configured to direct a later agent from the third node to the destination terminal node;
    determining a next node on the path from the third node based on data in a second navigation data table, wherein the data in the second navigation data table is configured to direct the first agent to the source terminal node; and
    directing the first agent to the next node.

14. The method of claim 13, wherein the data in the first navigation data table comprises information about one or more downstream nodes.

15. The method of claim 14, wherein the data in the first navigation data table further comprises a first weighting factor.

16. The method of claim 13, wherein the information about the path previously traveled by the first agent comprises information about the fourth node.

17. The method of claim 16, wherein the information about the fourth node comprises information pertaining to the operating characteristics of the fourth node.

18. The method of claim 16, wherein the information about the fourth node comprises information about the link connecting the third node to the fourth node.

19. The method of claim 13 wherein modifying the first navigation data table comprises changing at least one weighting factor to reinforce the path previously traveled by the first agent.

20. The method of claim 13, wherein the second navigation data table comprises information about one or more upstream nodes.

21. The method of claim 20, wherein the second navigation data table comprises at least a second weighting factor.

22. The method of claim 20, wherein the act of determining comprises assessing information about one or more upstream nodes, by combining such information with data from the second navigation data table.

23. The method of claim 13, further including:
sending a second agent from the source terminal node to the destination terminal node, the second agent traversing a path previously followed by the first agent, the second agent modifying navigation data of at least one intermediate node to reinforce the path previously followed by the first agent.

24. The method of claim 23, wherein modifying the navigation data comprises modifying the data in the second navigation data table.

25. The method of claim 24 wherein modifying the navigation data comprises changing at least one weighting factor.

26. A method of identifying a path through an asymmetric network of nodes interconnected by links, including a first node, a second node, and a plurality of other nodes, including:
sending a first agent from the first node to the second node via a third node, wherein the first agent determines the next node in the path based on data in a first downstream navigation data table at the third node, wherein the data in the first downstream navigation data table is configured to direct the first agent to the second node;
the first agent modifying the data in a first upstream data navigation table a at the third node, wherein the data in the first upstream data navigation table is configured to direct a subsequent agent to the first node.

27. The method of claim 26, further comprising:
sending a second agent from the second node to the first node via an intermediate node, wherein the second agent determines the next node in its path based on data in a third upstream navigation data table at the intermediate node, wherein the data in the third upstream navigation table is configured to direct the second agent to the first node; and
the second agent modifying the data in a fourth downstream navigation data table at the intermediate node, wherein the data in the fourth downstream navigation data table is configured to direct a subsequent agent to the second node.

28. The method of claim 26, further including identifying a preferred path from the first node to the second node by selecting a path followed by one or more agents arriving at the second node from the first node.

29. The method of claim 27, further including identifying a preferred path from the first node to the second node by selecting a path followed by one or more agents arriving at the first node from the second node.

30. A computer program product for identifying a path through an asymmetric network of nodes, the computer program product comprising a non-transitory tangible storage medium having computer readable code thereon, the computer readable program code including:
program code for maintaining a downstream routing table of navigation information;
program code for maintaining an upstream routing table of navigation information;
program code for sending a first agent from a first node to a second node via a third node, wherein the first agent independently navigates from the third node to its next location node by determining the next location node based on navigation information in the downstream routing table, the navigation information in the downstream routing table configured to direct the first agent to the second node; and
program code for modifying the navigation information in the upstream routing table as a function of the path traversed by the first agent prior to arriving at the third node, such that the navigation information in the upstream routing table is configured to direct a subsequent agent to the first node.

31. The computer program product of claim 30, wherein the downstream routing table is associated with the second node.

32. The computer program product of claim 30, wherein the upstream routing table is associated with the first node.

33. The computer program product of claim 30, wherein information in the navigation information in the upstream routing table includes information about at least one downstream node.

34. The computer program product of claim 33, wherein information in the navigation information in the upstream routing table includes at least one weighting factor.

35. The computer program product of claim 30, wherein navigation information in the upstream routing table includes information about at least one upstream node.

36. The computer program product of claim 35, navigation information in the upstream routing table e includes at least one weighting factor.

37. A method of establishing a path from a source terminal node, which may be referred-to as a first node, to a destination terminal node, which may be referred-to as a second node, through an asymmetric network comprising a plurality of interconnected nodes, wherein an agent traveling through the network traverses links connecting one node to the next until it reaches the source terminal node, including:
receiving a first agent at a third node from a fourth node, wherein the first agent originated at the destination terminal node and is navigating through the network to the source terminal node;
modifying a first navigation data table at the third node based on information about the path previously traveled by the first agent, wherein the data in the first navigation data table is configured to direct a later agent from the third node to the destination terminal node;
determining a next node on the path from the third node based on data in a second navigation data table, wherein the data in the second navigation data table is configured to direct the first agent to the source terminal node;
directing the first agent to the next node; and
sending a second agent from the source terminal node to the destination terminal node, the second agent traversing a path previously followed by the first agent, the second agent modifying navigation data of at least one intermediate node to reinforce the path previously followed by the first agent, wherein modifying the navigation data comprises modifying the data in the second navigation data table.

38. The method of claim 37 wherein modifying the navigation data comprises changing at least one weighting factor.

* * * * *